(12) United States Patent
Mittal et al.

(10) Patent No.: US 12,082,027 B2
(45) Date of Patent: Sep. 3, 2024

(54) COORDINATED CHANNEL STATE INFORMATION REPORTING

(71) Applicant: Apple Inc., Cupertino, CA (US)

(72) Inventors: Udar Mittal, Rolling Meadows, IL (US); Xiaowen Wang, Cupertino, CA (US); Haitong Sun, Cupertino, CA (US); Yushu Zhang, Beijing (CN); Wei Zeng, Saratoga, CA (US); Theodoros Kamakaris, San Jose, CA (US); Joseph Hakim, Soquel, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 17/437,797

(22) PCT Filed: Jun. 7, 2021

(86) PCT No.: PCT/CN2021/098586
§ 371 (c)(1),
(2) Date: Sep. 9, 2021

(87) PCT Pub. No.: WO2022/256963
PCT Pub. Date: Dec. 15, 2022

(65) Prior Publication Data
US 2022/0394527 A1 Dec. 8, 2022

(51) Int. Cl.
*H04W 24/10* (2009.01)
*H04W 72/54* (2023.01)
*H04W 76/14* (2018.01)

(52) U.S. Cl.
CPC .......... *H04W 24/10* (2013.01); *H04W 72/54* (2023.01); *H04W 76/14* (2018.02)

(58) Field of Classification Search
None
See application file for complete search history.

(56) References Cited

U.S. PATENT DOCUMENTS

2021/0045074 A1* 2/2021 Manolakos ........... H04L 5/0057
2021/0298030 A1* 9/2021 Li ......................... H04W 72/23
(Continued)

FOREIGN PATENT DOCUMENTS

| CN | 102170335 A | 8/2011 |
| EP | 2317793 A1 | 5/2011 |

OTHER PUBLICATIONS

International Search Report and Written Opinion for PCT/CN2021/098586; 9 pages; Feb. 25, 2022.
(Continued)

*Primary Examiner* — Anh Ngoc M Nguyen
(74) *Attorney, Agent, or Firm* — Kowert, Hood, Munyon, Rankin & Goetzel, P.C.

(57) ABSTRACT

This disclosure relates to techniques for coordinated channel state information reporting in a wireless communication system. A wireless device may establish a wireless link with a cellular base station. The wireless device may determine to coordinate channel state information reporting with another wireless device. Information may be exchanged with the other wireless device via a sidelink wireless link. The wireless device may provide channel state information to the cellular base station. The channel state information may be determined based at least in part on the information exchanged with the other wireless device via the sidelink wireless link.

17 Claims, 11 Drawing Sheets

(56) References Cited

U.S. PATENT DOCUMENTS

2021/0410135 A1* 12/2021 Yu .................... H04B 7/0626
2022/0014338 A1*  1/2022 Yoshioka ............. H04W 8/005

OTHER PUBLICATIONS

Huawei et al. "Further views on Rel-17 work area on NR sidelink enhancements for V2X and other use cases"; 3GPP TSG RAN Meeting #95 RP-191831; Newport Beach, USA; 13 pages; Sep. 20, 2019.
Samsung et al. "Other open issues for CSI report"; 3GPP TSG RAN WG3 #88 R3-151117; Fukuoka, Japan; 2 pages; May 25-29, 2015.
Extended European Search Report for EP Patent Application No. 21890361.5; 9 pages; Oct. 10, 2022.
Yin et al. "Enabling massive MIMO systems in the FDD mode thanks to D2D communications"; 2014 48th Asilomar Conference on Signals, Systems and Computers, IEEE; 5 pages; Nov. 2, 2014.
Chen et al."Efficient Feedback Mechanisms for FDD Massive MIMO under User-level Cooperation"; Arxiv.Org, Cornell University Library; 13 pages; Nov. 22, 2016.

* cited by examiner

COORDINATED CHANNEL STATE INFORMATION REPORTING

PRIORITY CLAIM INFORMATION

This application is a U.S. National Stage application of International Application No. PCT/CN2021/098586, filed Jun. 7, 2021, titled "Coordinated Channel State Information Reporting", which is hereby incorporated by reference in its entirety.

FIELD

The present application relates to wireless communications, and more particularly to systems, apparatuses, and methods for coordinated channel state information reporting in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for coordinated channel state information reporting in a wireless communication system.

According to the techniques described herein, two (or more) wireless devices may determine to coordinate their channel state information reporting. The coordinated channel state information reporting may be conditional on any of a variety of considerations, such as application data needs and battery reserves for each of the cooperating wireless devices.

Once the wireless devices determine to coordinate their channel state information reporting, they may exchange information relating to their channel state information measurements via a sidelink wireless link, such as Bluetooth, Wi-Fi, or cellular sidelink. This exchange of information may facilitate selection of analog and/or digital beam information for reporting by each of the cooperating wireless devices that increases the likelihood of the cooperating wireless devices being co-scheduled, either in the same transmission time interval but for different frequency resources in a single user cellular network configuration, or for the same time frequency resource(s) in a multi user cellular network configuration. For example, the wireless devices may negotiate to determine an analog beam that works for all of the coordinating wireless devices, both for single user and for multi user configurations. For multi user configurations, the wireless devices may further negotiate to determine orthogonal or at least relatively uncorrelated precoding vector/matrix configurations.

Such coordination of channel state information reporting may be performed with or without the knowledge of the cellular base station serving the cooperating wireless devices. In case the cellular base station is aware of the possibility for coordination of channel state information reporting, the cellular base station may facilitate such coordination, for example by providing identification information for one or more candidate wireless devices for coordinated channel state information reporting to a wireless device when requesting channel state information reporting from that wireless device. It may also be possible for wireless devices performing coordinated channel state information reporting to provide information identifying the wireless device(s) with which the coordinated channel state information reporting is being performed when providing the channel state information to the cellular base station, and/or for the cellular base station to provide an indication to a wireless device when a communication with the wireless device is co-scheduled with a communication with another wireless device that performed coordinated channel state information reporting with the wireless device.

Such techniques may help reduce any scheduling delays experienced by the wireless devices performing such coordinated channel state information reporting, at least according to some embodiments. For example, at least according to some network scheduling algorithms, it may be the case that a cellular base station is more likely to schedule wireless device communications when multiple wireless devices can be scheduled in the same subframe, particularly if it may be possible to perform multi-user scheduling for those wireless devices. Further, it may be possible that the coordinated channel state information reporting techniques described herein may improve overall network throughput, at least according to some embodiments. For example, it may be possible that coordinated channel state information reporting can enable a cellular base station to be able to perform multi-user scheduling during at least some subframes when multi-user scheduling would not otherwise be possible (e.g., due to beam configuration incompatibility between wireless devices served by the cellular base station), which may increase the throughput for those subframes.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
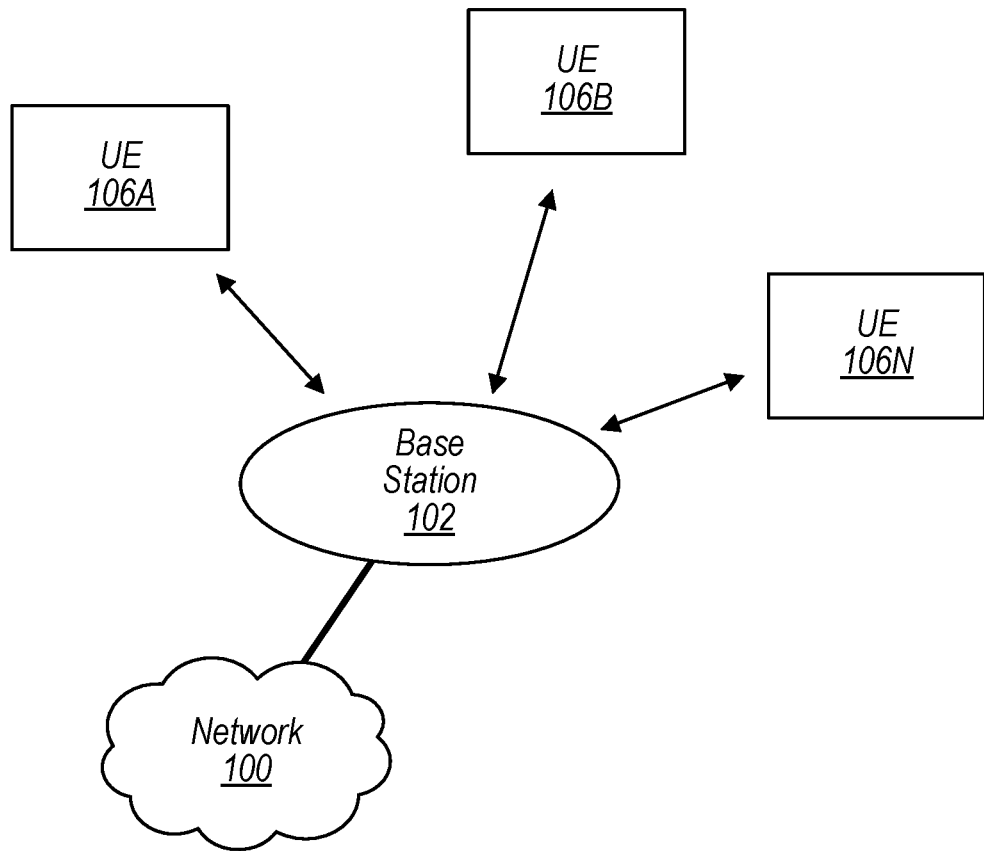
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
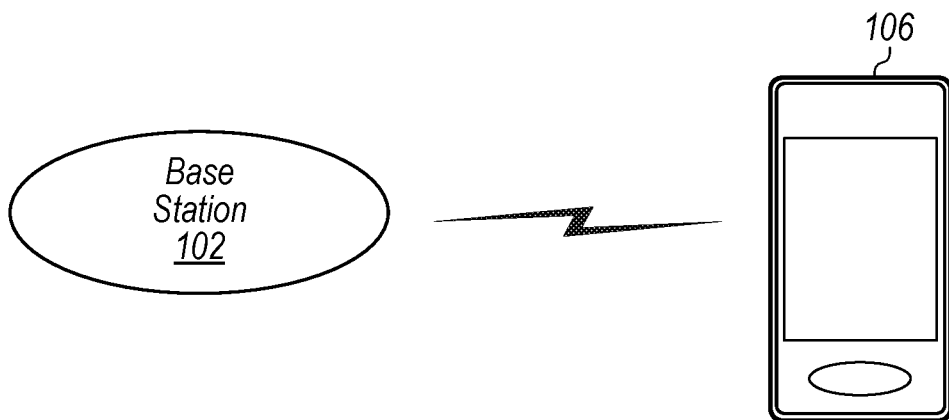
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for coordinated channel state information reporting in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
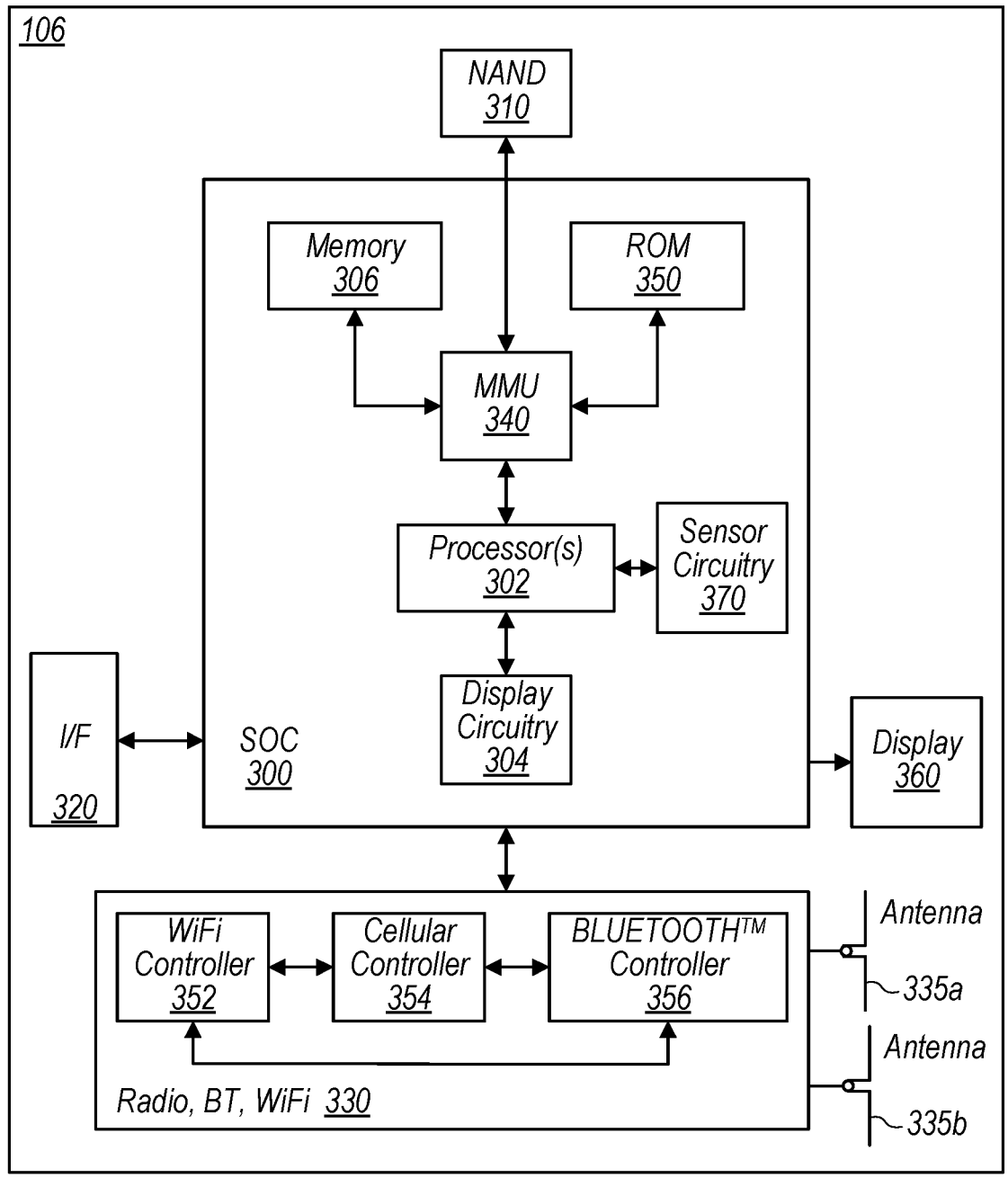
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for coordinated channel state information reporting in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for coordinated channel state information reporting in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
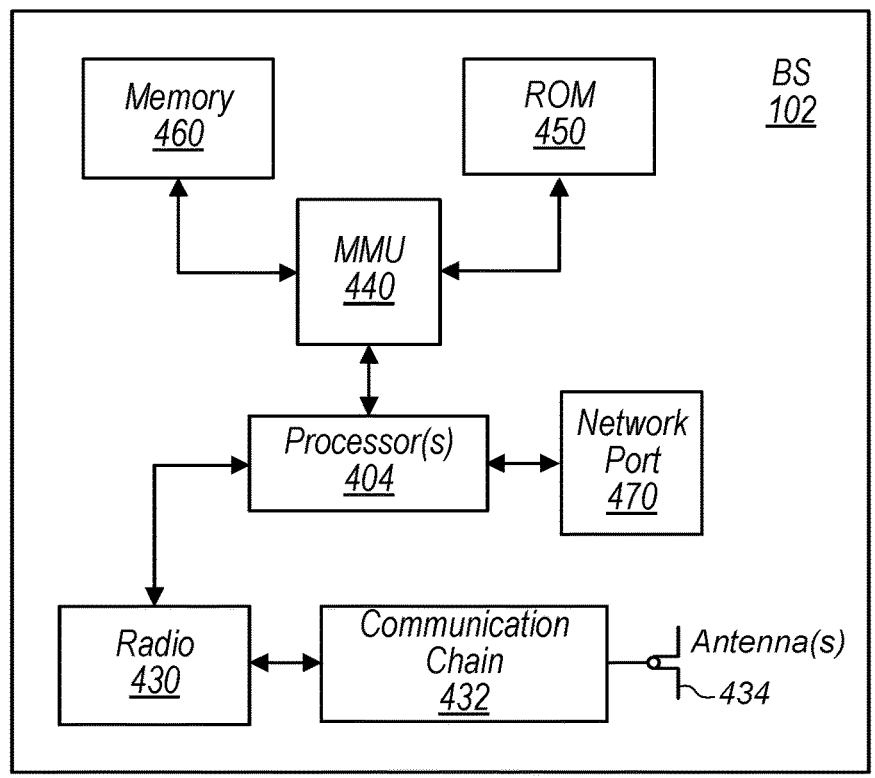
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block indicator, and a Layer indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments. In some instances, the precoding matrix may effectively configure a digital beam that is used to direct wireless transmissions between a UE and a BS in the azimuthal angle.

CRI and/or SSBRI feedback may be used indicate to which reference signal resource(s) the CSI reporting is applicable. For example, in some instances, a UE may perform signal measurements on signals provided by a BS on each of a set of SSB and/or CSI-RS resources, where a different beam may be used by the BS to transmit on some or all of these resources. The UE may determine which of these beams is best for the UE, may determine the CSI reporting parameter values based on the signal received using that beam, and may also report the corresponding resource using a CRI or SSBRI associated with the resource. Thus, at least in some instances, the CRI and/or SSBRI feedback may effectively configure an analog beam that is used to direct wireless transmissions between a UE and a BS in the elevation angle.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
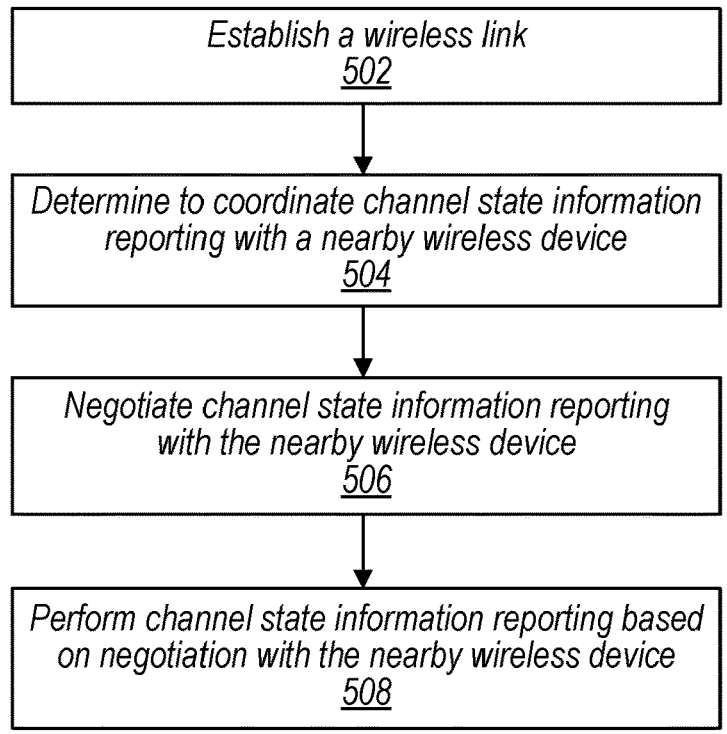
FIG. 5 is a flowchart diagram illustrating aspects of an exemplary possible method for coordinated channel state information reporting in a wireless communication system, according to some embodiments.

FIG. 5—Coordinated Channel State Information Reporting

Cellular network scheduling flexibility may be limited, at least in some circumstances, by analog and/or digital beam compatibility of the devices being scheduled. For example, in some instances, a cellular base station may be limited to scheduling only devices with the same analog beam (e.g., electronic down tilt or elevation angle) within a given transmission time interval, e.g., so that the cellular base station can use the same analog beam all data communications during that transmission time interval. As another example, for multi user scheduling, it may be the case that a cellular base station can only schedule two devices for the same time frequency resource if there is sufficient separation between the digital beams (e.g., precoding vectors/matrices) for the devices, e.g., to reduce or avoid possible interference between the transmissions to the co-scheduled devices.

It may be common for multiple wireless devices that have some type of association with each other to be located in the same vicinity. For example, one person may use multiple wireless devices (e.g., with a common cellular service plan), such as a smart watch and a smart phone. As another example, family members (e.g., who may have a family plan for cellular service) may often be in the same house, travel together in the same vehicle, or otherwise be in the same vicinity as each other, potentially each with one or more respective wireless devices.

Given the possible scheduling limitations for at least some cellular communications, it may be possible for devices that are in the same vicinity, which could potentially include devices in the same cellular service plan or otherwise associated wireless devices, to coordinate their channel state information feedback in such a way as to increase the likelihood that their serving cellular base station can co-schedule them. This could in turn reduce communication delays for the cooperating wireless devices, and may even possibly increase network throughput.

Thus, it may be beneficial to provide techniques for supporting coordinated channel state information reporting. To illustrate one such set of possible techniques, FIG. 5 is a flowchart diagram illustrating a method for a wireless device to coordinate with another wireless device to perform channel state information reporting in a wireless communication system, at least according to some embodiments.

Aspects of the method of FIG. 5 may be implemented by a wireless device, e.g., in conjunction with one or more other wireless devices and/or one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may determine to coordinate channel state information reporting with a nearby wireless device. Determining whether to coordinate channel state information reporting with a nearby wireless device (and potentially determining with which nearby device, or devices, to coordinate) may be based on any of a variety of considerations. As one such possibility, it may be the case that performing coordinated channel state information reporting may be limited to wireless devices with one or more specified/configured types of association with each other, such as wireless devices that are part of the same cellular service plan, or that have otherwise been configured (e.g., including user authorization) to be allowed to perform coordinated channel state information reporting with each other.

Another possible consideration could include the application data needs of the wireless device, and/or the device(s) being considered for cooperative channel state information reporting. In some instances, cooperative channel state information may increase the likelihood of the cooperating devices being scheduled, but it may be possible that the resources in the frame being scheduled are shared between the cooperating devices, such that each device may obtain less throughput than if channel state information without coordination/cooperation were performed. Additionally or alternatively, if the cooperative channel state information includes coordination to select an analog beam and/or precoding vector(s) that increases the likelihood of co-scheduling but provides lower spectral efficiency, it could be the case that one or both coordinating wireless devices may receive less than the maximum potential throughput. Accordingly, at least in some embodiments, if application data needs of one or both wireless devices that could potentially perform cooperative channel state information reporting are relatively high (e.g., above a configured threshold), the wireless device may determine to not coordinate channel state information reporting with that particular wireless device. Note that the application data needs of the wireless device may be determined in any of various possible ways.

A further possible consideration could include the battery reserve level of the wireless device, and/or the device(s) being considered for cooperative channel state information reporting. Additionally or alternatively, a power consumption/performance mode (e.g., whether a lower battery mode or a normal mode is active) of the wireless device, and/or the device(s) being considered for cooperative channel state information reporting, may be considered when determining whether to coordinate channel state information. For example, in some instances, if battery reserves are low (e.g., below a configured threshold), and/or a lower power consumption operating mode is active, for one or both wireless devices that could potentially perform cooperative channel state information reporting, the wireless device may determine to not coordinate channel state information reporting with that particular wireless device. In some instances, when the battery of one of the devices is low, the devices can coordinate such that the device with higher battery reserves sends shared channel state information feedback on behalf of both devices, e.g., so that the device with the lower battery reserves may not need to send channel state information feedback.

In some instances, the cellular base station serving the wireless device may provide an indication of one or more other wireless devices with which the wireless device could potentially perform cooperative channel state information reporting. For example, the cellular base station could provide a channel state information request (e.g., configuring periodic channel state information reporting, or requesting an aperiodic channel state information report) that indicates information identifying one or more candidate wireless devices for cooperative channel state information reporting, such as any wireless devices in the same cellular service plan as the wireless device that are also currently served by the cellular base station. In some instances, the cellular base station may additionally or alternatively indicate any configured rank restrictions for coordinated channel state information reporting.

Note that any or all of the considerations described herein, among other possible considerations, may be used when determining whether to perform cooperative channel state information reporting with another wireless device, individually or in any of various possible combinations.

In 506, the wireless device may exchange information with the nearby wireless device via a sidelink wireless link. At least in some instances, the information exchanged may include information used to determine whether to perform cooperative channel state information reporting together. For example, one or both wireless devices may provide an indication that their application data needs and/or battery reserves meet any configured conditions for performing cooperative channel state information reporting, if applicable. If one of the wireless devices does not meet all configured conditions for performing cooperative channel state information reporting, it may also be possible that the wireless device that does not meet all configured conditions for performing cooperative channel state information reporting provides an indication of such to the other wireless device. In such a scenario, those wireless devices may not perform cooperative channel state information reporting.

If both wireless devices agree to perform cooperative channel state information reporting, the information exchanged may include information that is used to coordinate the channel state information between the cooperating wireless devices. This information may include any of various possible types of information.

As one possibility, one wireless device (e.g, a wireless device that initiates the cooperative channel state information reporting) may provide an indication of one or more candidate analog beams for the wireless device. The cooperating wireless device may provide feedback information for at least some of the candidate analog beams, which may facilitate selection of an analog beam that is calculated as potentially providing a best combined performance for the cooperating wireless devices among the candidate beams. For example, as one possibility, the cooperating wireless device may indicate perceived throughput values for each of the candidate beams to the initiating wireless device. Based on the feedback from the cooperating wireless device and its own channel state information measurements (e.g., including its own perceived throughput values for each of the candidate beams), the initiating wireless device may select an analog beam to report. The initiating wireless device may also provide an indication of the selected analog beam to the cooperating wireless device, which the cooperating wireless device may also select for its own channel state information reporting.

As another possibility, for example in case of multi-user cellular base station operation, the initiating wireless device may also provide an indication of possible precoding vectors for each candidate beam for the initiating wireless device to the cooperating wireless device. The cooperating wireless device may provide feedback information for at least some of the possible precoding vectors, which may facilitate selection of an analog beam and a set of precoding vectors by the initiating wireless device that is calculated as potentially resulting in a best combined performance for the cooperating wireless devices. For example, as one possibility, the cooperating wireless device may indicate a correlation measure for each possible precoding vector and the corresponding perceived throughput values to the initiating wireless device. Based on the feedback from the cooperating wireless device and its own channel state information measurements (e.g., including its own perceived throughput values for each of the possible precoding vectors), the initiating wireless device may select an analog beam and set of precoding vectors to report. The initiating wireless device may also provide an indication of its resulting channel state information to the cooperating wireless device, which the cooperating wireless device may use to determine its own analog beam and set of precoding vectors to report when performing channel state information reporting.

Note that any of various possible sidelink communication techniques may be used to exchange the information for coordinating channel state information reporting by the cooperating wireless devices. Some possible wireless communication technologies that may be used could include Bluetooth, Wi-Fi, or cellular sidelink connections; other wireless communication technologies can also be used, according to various embodiments. In some instances, wireless device identification information indicating a wireless device that is a candidate for cooperative channel state information reporting, which is provided to a wireless device in a channel state information request, may be used when establishing a cellular sidelink wireless link to exchange information for coordinating channel state information reporting.

In 508, the wireless device may perform channel state information reporting. The channel state information reporting may include providing channel state information for the wireless device to the cellular base station, which is determined based at least in part on the information exchanged with the cooperating wireless device via the sidelink wireless link.

For example, in some instances, the channel state information reporting by the wireless device may include providing an indication of an analog beam that is selected based at least in part on information received from the cooperating wireless device, such as an analog beam that is selected to be the same analog beam that the cooperating wireless device reports to the cellular base station in its channel state information.

As another example, in some instances, the channel state information reporting by the wireless device may include providing an indication of a set of precoding vectors that is selected based at least in part on the information received from the cooperating wireless device, such as a set of precoding vectors that is selected to be have low correlation (e.g., to be orthogonal) with a set of precoding vectors that the cooperating wireless device reports to the cellular base station in its channel state information.

According to some embodiments, the coordinated channel state information may be provided in a manner that is transparent to the cellular base station. In other words, it may be the case that the cellular base station receives the channel state information from the cooperating wireless devices without knowing that the channel state information reporting was performed in a coordinated manner by the cooperating wireless devices.

In other embodiments, it may be the case that the cellular base station is aware of when wireless devices are cooperatively performing channel state information reporting. For example, as previously noted herein, in some instances it may be possible that the cellular base station can indicate one or more candidate wireless devices for cooperative channel state information reporting when requesting channel state information from a wireless device. Additionally, or alternatively, it may be possible that a wireless device that is performing coordinated channel state information reporting provides an indication that its channel state information reporting is coordinated with another wireless device. Such an indication could include wireless device identification information (e.g., a wireless device identifier such as a cell radio network temporary identifier (C-RNTI)) for the wireless device(s) with which the coordinated channel state information reporting is performed.

Note that it may also be possible for the wireless device to provide multiple channel state information reports (or a multi-part channel state information report) to the cellular base station, for example in order to provide both channel state information that is generated in coordination with a cooperating wireless device and channel state information that is generated independently from any other wireless devices. Such information may allow the cellular base station to select its beamforming configuration (e.g., analog beam and/or precoding vectors) for the wireless device based at least in part on whether the wireless device is co-scheduled with the cooperating wireless device.

For example, if the cellular base station determines to schedule two cooperating wireless devices in the same subframe or transmission time interval, it may be the case that the cellular base station uses the beam configurations provided by those wireless devices in the channel state information reported in coordination with each other. In such a scenario, the cellular base station may provide an indication to each of the cooperating wireless devices of the co-scheduling, which may facilitate use of the appropriate beam configuration by each of the wireless devices to perform their respective scheduled communications.

Note that providing channel state information generated in a coordinated manner and also providing independently generated channel state information may also help the cellular base station to decide how to schedule the cooperating wireless devices, as well as other wireless devices in the cellular communication system, in an efficient manner. For example, such information may help the cellular base station to determine whether to co-schedule the cooperating wireless devices, to only schedule one wireless device among a set of wireless devices, or to schedule a wireless device in a set of cooperating wireless devices with another wireless device that is not in the set of cooperating wireless devices, and to select in which frequency subbands or resource blocks to schedule each wireless device being scheduled, among various possibilities.

If the cellular base station determines to schedule the wireless device and to not schedule its cooperating wireless device in the same subframe or transmission time interval, it may be the case that the cellular base station uses the beam configuration provided by the wireless device in the channel state information generated independently of any other wireless device. In such a scenario, the cellular base station may provide an indication to the wireless device that it is not co-scheduled with its cooperating wireless device, or alternatively, may implicitly indicate to the wireless device that it is not co-scheduled with its cooperating wireless device by not providing an indication to the wireless device that it is co-scheduled with any other wireless devices, among various possibilities. The wireless may accordingly be able to determine to use the beam configuration provided by the wireless device in the channel state information generated independently of any other wireless device to perform the communication.

The cellular base station and the wireless device may subsequently perform any such scheduled communications. At last according to some embodiments, such communication may be performed using a beam configuration determined based at least in part on whether the scheduled communication is co-scheduled with a wireless device with which the wireless device performed cooperative channel state information reporting.

It should be noted that while at least some embodiments are described herein as including coordinated channel state information reporting between two wireless devices for simplicity of explanation, it may also be possible for coordinated channel state information reporting to be performed according to the techniques described herein for more than two wireless devices.

Thus, at least according to some embodiments, the method of FIG. 5 may be used to provide a framework according to which wireless devices can coordinate to perform channel state information reporting, which may reduce communication delays and/or improve network resource use efficiency, among other possible benefits, at least in some instances.

FIGS. 6-14 and Additional Information

FIGS. 6-14 illustrate further aspects that might be used in conjunction with the method of FIG. 5 if desired. It should be noted, however, that the exemplary details illustrated in and described with respect to FIGS. 6-14 are not intended to be limiting to the disclosure as a whole: numerous variations and alternatives to the details provided herein below are possible and should be considered within the scope of the disclosure.

It may be possible for multiple gNBs belonging to the same family or operator to use a multi-TRP approach to transmit data simultaneously to a single UE in the same TTI/RB. To facilitate this, gNBs may cooperate through a backhaul connection, and may request that a UE send CSI reports in such a manner as to cater to such transmission.

A conceptually similar approach could be used for UEs belonging to a group or family to cooperate among themselves during the preparation and/or sending of CSI feedback reports. The cooperation could potentially increase the likelihood of the UEs being scheduled in the same TTI or even the same time-frequency resource. This may improve the user experience of the cooperating UEs, for example by decreasing the likely delay while providing a data communication rate sufficient for their application needs. At least in some embodiments, this can be accomplished by making cooperative CSI feedback reporting dependent on the cooperating UEs' application data requirements.

As previously described herein, at least according to some embodiments, a CSI report may include CQI (e.g., for determining MCS level), PMI (e.g., for determining precoding matrix), CRI/SSBRI (e.g., for determining beam), LI, RI, and/or L1-RSRP. In some instances, generating CSI feedback by a UE may include finding the precoding matrix that maximizes the received signal quality for a particular rank. The MCS level that results in a packet error rate that is less than a predefined target may be obtained. The best throughput based on rank and MCS level may be determined. Additionally, before reporting, the UE may check whether the determined CSI feedback to be reported conforms to any constraints imposed by the network, such as making sure that the difference from the wideband CQI is less than 2 if reporting subband CQI, making sure the rank of the reported precoding matrix for all subbands is the same, and/or making sure it conforms to the codebook subset restriction (CBSR).

At least according to some embodiments, use of CSI feedback may help the UE to maximize its throughput. In case of MIMO, providing a good precoding matrix may help ensure good perceived SINR. Additionally, it may increase the chance of being scheduled by the gNB, particularly in case of proportional fair scheduling. For the gNB, use of CSI feedback may help enable performance of frequency selective scheduling, multi-user scheduling, and/or may help maximize gNB throughput, among various possibilities.

Cooperative CSI feedback reporting can be used in multiple possible scenarios. As one possibility, it may be used for CSI feedback in single user (SU) mode, where UEs may cooperate so that they send the same beam as part of their CSI feedback report. As another possibility, it may be used for CSI feedback in multi user (MU) mode, where UEs may cooperate so that they send the same beam as part of their CSI feedback report, and also may cooperate to negotiate precoding vectors such that they are orthogonal/uncorrelated.

Such approaches can be implemented in a standard transparent way, or may be implemented in such a manner as to include support in the 3GPP standard. In a standard transparent approach, it may be the case that the gNB does not know which UEs are cooperating for the CSI feedback report. In such a scneario, the cooperating UEs may negotiate to coordinate the CSI feedback reports on a Wi-Fi or Bluetooth link to make a decision on the CSI feedback to be send back to gNB, at least according to some embodiments.

In an approach that includes explicit 3GPP support, the gNB may know which UEs can cooperate with each other (e.g., UEs that are part of a joint service plan, as one possibility), and may suggest to a UE that it may cooperate with one or more of a particular set of UEs. The UE CSI report may include a non-coordinated CSI report as well as a CSI report involving cooperation, at least in some instances. The CSI report involving cooperation may also indicate the identity (or identities) of the UE(s) with which the reporting UE is cooperating.

In some instances, it may be possible that a gNB may give priority to UEs which are cooperating while sending a CSI report during scheduling. In some instances, while providing a scheduling grant, a gNB may inform UEs that are coordinating their CSI feedback reports about co-scheduled UEs if they are part of the same group. In such a scenario, the cooperating UEs may negotiate to coordinate the CSI feedback reports on a cellular sidelink, Wi-Fi, or Bluetooth link to make a decision on the CSI feedback to be send back to gNB, at least according to some embodiments. Note that at least in some instances, computation of CSI feedback from the cooperating UEs may also or alternatively be based at least in part on whether it is possible for the UEs to cooperate during decoding operation.

Figure 6:
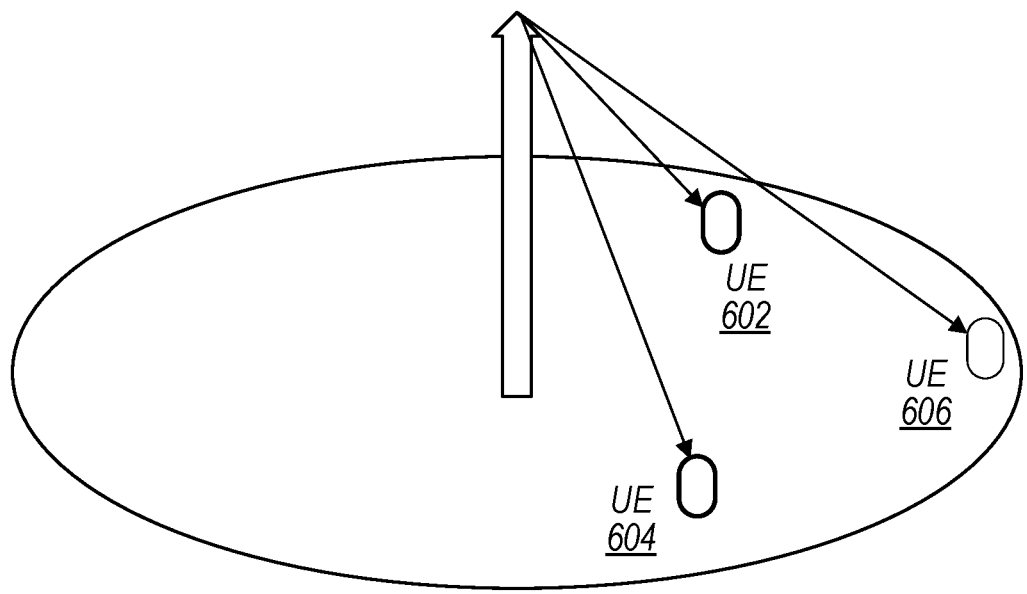
FIG. 6 illustrates exemplary aspects of a possible gNB performing SU scheduling with single TRP transmission, according to some embodiments.

FIG. 6 illustrates exemplary aspects of a possible gNB performing SU scheduling with single TRP transmission, according to some embodiments. According to the SU scheduling scheme, only one UE may be granted access by the gNB to one resource block/subband/time frequency resource. The gNB may use the subband CSI feedback information to decide which resource(s) to allocate to which UE(s). Proportional fair scheduling may be a preferred approach when using frequency selective scheduling, or any of various other possible scheduling approaches may be used, as desired. For example, a round robin based scheduling approach may be used, as another possibility. The gNB may use the precoding matrices reported by the UE for the transmission. In hybrid digital-analog beamforming, any two UEs scheduled in a single TTI may be required to have the same analog beam; for example, the gNB may not support using a different analog beam for different UEs even if the UEs are scheduled using different time frequency resources within a TTI. Thus, in the illustrated example, the analog beam may provide the electronic down tilt (elevation) angle and the digital beam may provide the azimuth angle. Since UE 602 and UE 604 are (e.g., approximately) equally distant from the gNB, they may have the same analog beam and hence it may be possible for them to be co-scheduled in a TTI using different time frequency resources. It may be the case that UE 606 can't be co-scheduled in the same TTI, e.g., since it may be at a greater distance from the gNB and have a different analog beam than UE 602 and UE 604.

Figure 7:
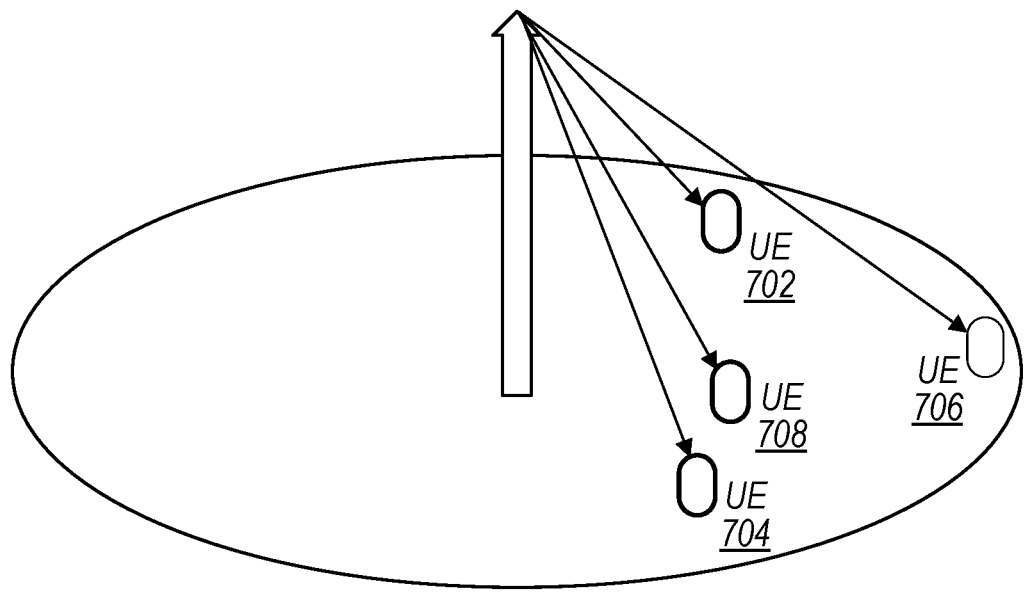
FIG. 7 illustrates exemplary aspects of a possible gNB performing MU scheduling with single TRP transmission, according to some embodiments.

FIG. 7 illustrates exemplary aspects of a possible gNB performing MU scheduling with single TRP transmission, according to some embodiments. According to the MU scheduling scheme, more than one UE is granted access by the gNB to one resource block/subband/time frequency resource. The gNB may use the precoding matrices reported by the UEs for the transmission. In MU scheduling using hybrid digital-analog beamforming, any two UEs scheduled in a single TTI may also be required to have the same analog beam, e.g., such that the gNB may not support using a different analog beam for different UEs within a TTI. In addition, in this case the reported digital beam/precoder may be required to be separated (e.g., be orthogonal or uncorrelated). In the illustrated example, UE 702, and UE 704, and UE 708 are (e.g., approximately) equally distant from the gNB, and may have the same analog beam, while UE 706 may have a different analog beam. However, UE 704 and UE 708 are not sufficiently separated in the illustrated scenario, and the gNB may not be able to schedule them in the same time frequency resource. It may possible for UE 702 and UE 704 to be co-scheduled in the same time frequency resource, as there may be sufficient azimuthal separation between them.

Figure 8:
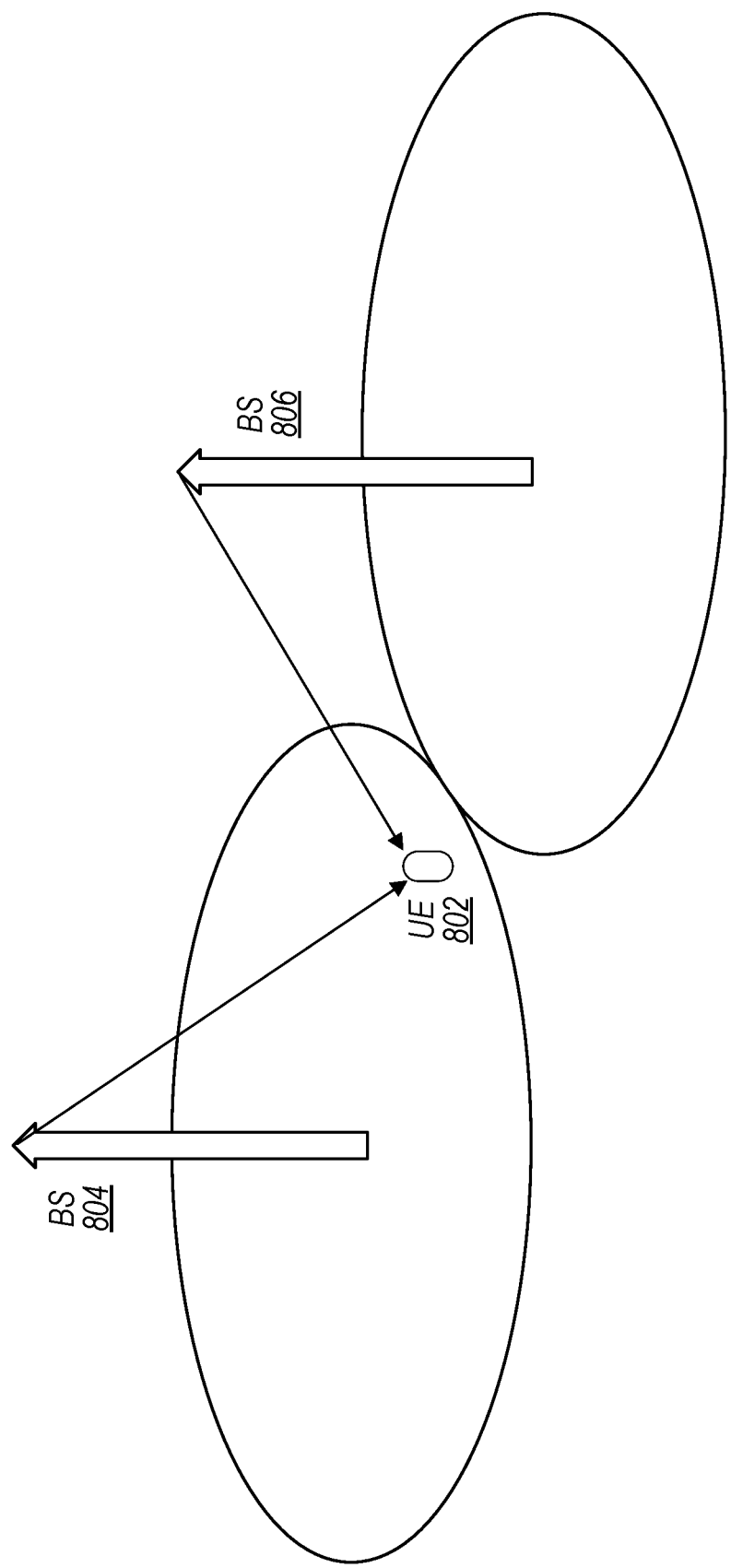
FIG. 8 illustrates exemplary aspects of a possible multi-TRP transmission scenario, according to some embodiments.

FIG. 8 illustrates exemplary aspects of a possible multi-TRP transmission scenario, according to some embodiments. In the illustrated scenario, two gNBs 804, 806 may be able to simultaneously transmit to a particular UE 802 using the same or different time frequency resources. The gNB(s) 804, 806 in such a scenario may request that the UE 802 provide CSI feedback reporting configured to support transmission from more than one gNB. At least according to some embodiments, such a scheme may require a backhaul link for information exchange between the gNBs 804, 806. It may generally be the case that the gNBs coordinating in such a scenario are associated with the same network operator (or are otherwise associated).

Figure 9:
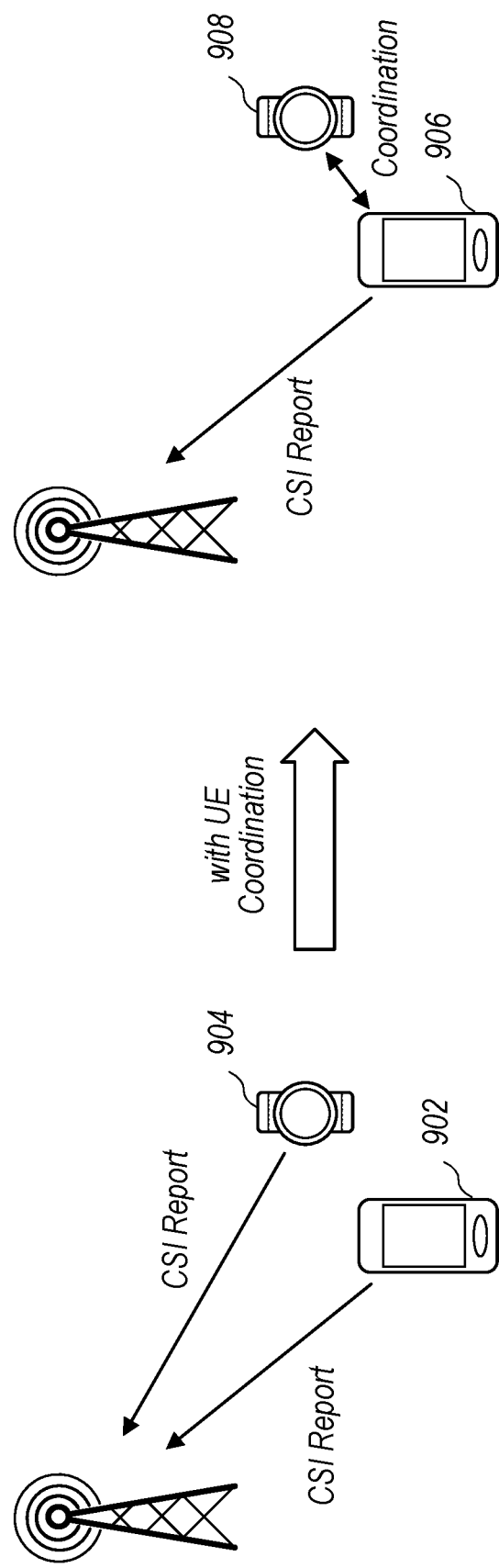
FIG. 9 illustrates exemplary aspects of a possible coordinated CSI reporting approach in which one UE performs CSI reporting for a group of coordinated UEs, according to some embodiments.

There may be multiple possible approaches to cooperatively perform CSI reporting for UEs. One such possible approach could include UEs co-ordinating among themselves and sharing a common CSI report (e.g., thereby reducing the number of reports), which may potentially decrease the CSI reporting overhead. It may be the case that each UE within such a coordination group can perform CSI measurements and one of the UEs reports the CSI for each UE, or that only one UE performs CSI measurements and reports the CSI feedback for the coordinated group of UEs. FIG. 9 illustrates exemplary aspects of such possible coordinated CSI reporting approaches, according to some embodiments. As shown, instead of independently performing CSI measurements and reporting at each UE 902, 904, two UEs 906, 908 may coordinate and one of the UEs 906 may perform CSI reporting based on the coordination between the UEs 906, 908.

Another possible approach could include UEs that decide to coordinate their CSI reporting each performing CSI measurements, sharing information with each other to potentially coordinate their CSI feedback in such a manner as to potentially benefit both UEs, and each UE reporting its own CSI feedback (e.g., which may be determined based at least in part on the information shared between the coordinating UEs). Such an approach may be useful for a person with multiple wireless devices (e.g., phone, smart watch, vehicle, etc.), for family members who may commonly be co-located (such as when traveling together in a vehicle, in their home, on vacation, etc.), and/or in a variety of other possible scenarios. For example, in some instances, it may be possible that there may be some correlation between the CSI feedback of such devices, and that cooperatively performing CSI reporting may be capable of utilizing the correlation to improve the user experience for the user(s) of the cooperating devices.

Figure 10:
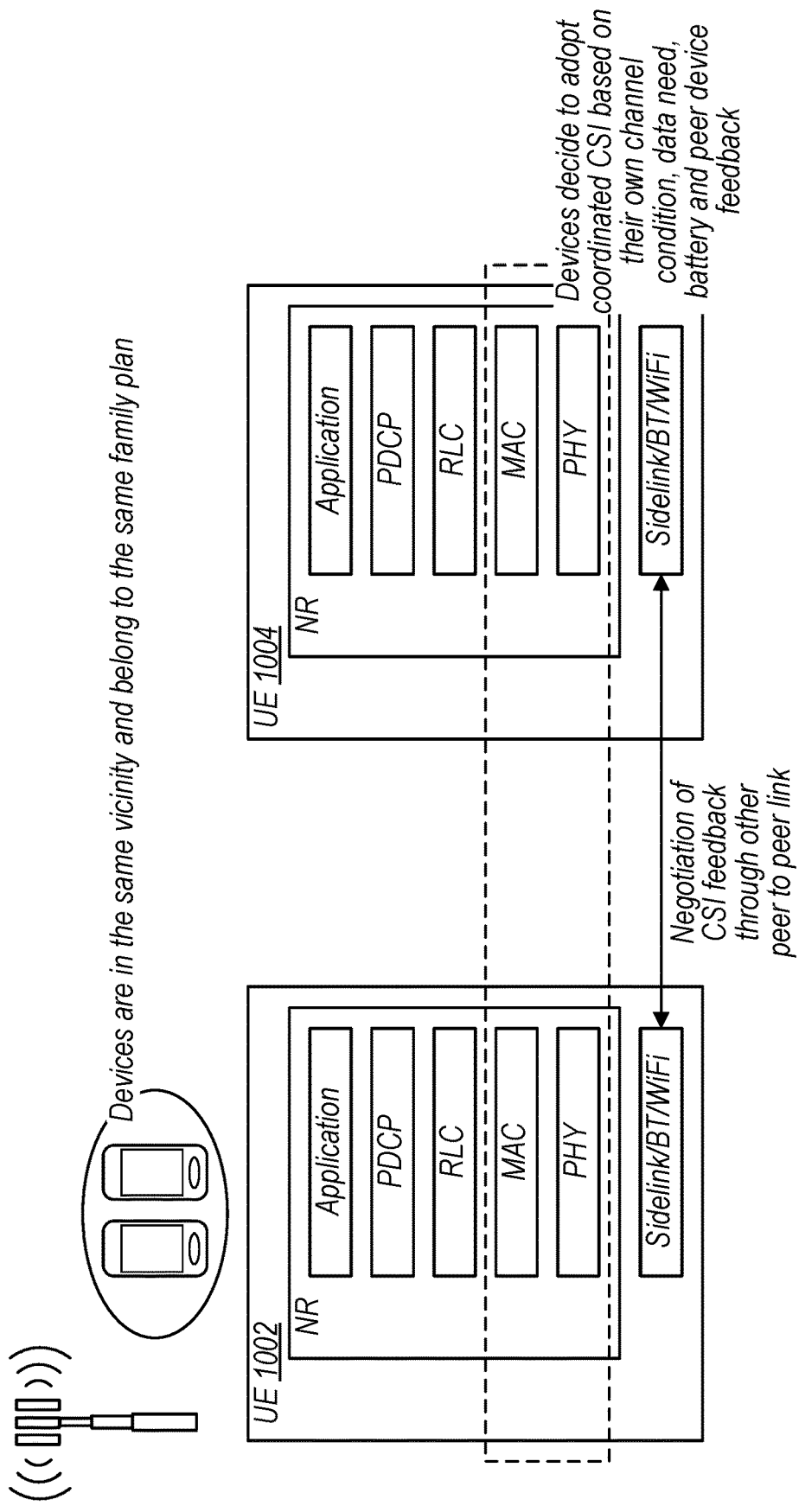
FIG. 10 illustrates exemplary aspects of a possible cooperative CSI reporting architecture, according to some embodiments.

FIG. 10 illustrates exemplary aspects of a possible cooperative CSI reporting architecture, according to some embodiments. In the illustrated scenario, UE 1002 and UE 1004 may be devices in the same vicinity and belonging to the same family plan (or otherwise associated). Each device may determine to adopt coordinated CSI feedback reporting, for example based on its own channel condition, data need, battery reserves, peer device feedback, and/or any of various other possible considerations. The CSI feedback provided by each of UE 1002 and UE 1004 may be determined based at least in part on information negotiated with the peer device through a peer-to-peer link, which could include a cellular sidelink channel, a Bluetooth link, a Wi-Fi link, and/or any of various other possible wireless links.

Figure 11:
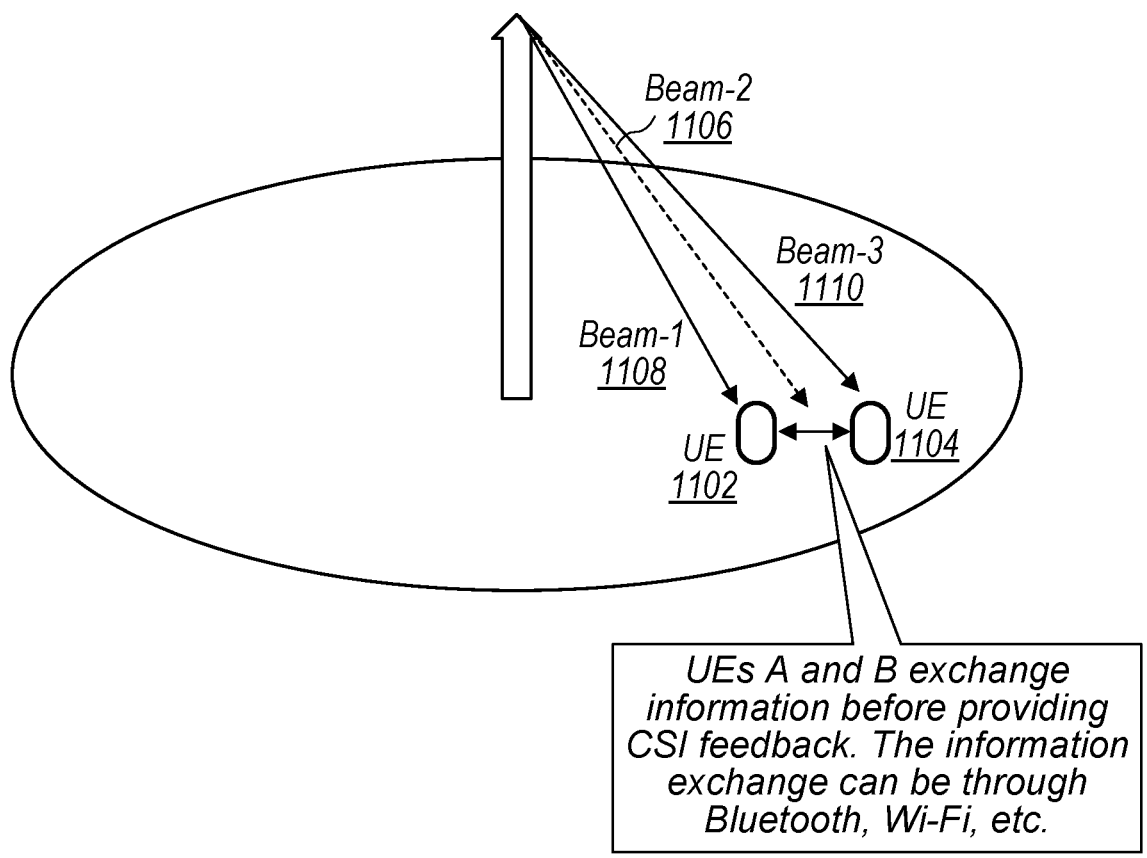
FIG. 11 illustrates exemplary aspects of a possible scenario in which UEs can perform cooperative CSI reporting in a standard transparent manner, according to some embodiments.

FIG. 11 illustrates exemplary aspects of a possible scenario in which UEs can perform cooperative CSI reporting in a standard transparent manner, according to some embodiments. In the illustrated scenario, a group or family of UEs may cooperate with each other to form their CSI, in such a manner as to increase the likelihood of being co-scheduled in the same TTI. When reporting CSI feedback, it may be the case that a UE provides a best beam as part of the CSI feedback. When not cooperatively performing CSI reporting, these beams may be chosen independently by each UE. For UEs that have determined to cooperatively report CSI feedback, such as the illustrated UEs 1102, 1104, it may be the case that the analog beam is selected in a cooperative manner, for example such that instead of independently selecting (potentially different) analog beams, they select one beam such that:

$$\arg\max_{Beams} \sum_{j \in RB} \max(TP_A(RB_j), TP_B(RB_j))$$

where $TP_A$ and $TP_B$ are the estimated throughput of UE 1102 and UE 1104, respectively. Note that it may be possible for a UE to totally reject a particular beam if its own (individual) throughput is too low (e.g., below a configured threshold, which may be fixed or dynamically determined based on current estimated data need for the UE, among various possibilities) for that beam, e.g., even if use of that beam would result in a comparatively high value for the coordinated metric in use, such as the preceding example metric.

Thus, in the scenario illustrated in FIG. 11, UE 1102 and UE 1104 may cooperatively determine (e.g., by exchanging information via Bluetooth, Wi-Fi, etc.) to each report Beam-2 1106 instead of UE 1102 reporting Beam-1 1108 and UE 1104 reporting Beam-3 1110. Such an approach may be useful in scenarios in which each UE does not need the full amount of resources in each TTI, as it may increase the likelihood that the UEs are scheduled (e.g., with the gNB allocating different RBs in the TTI to UE 1102 and UE 1104), and may thus result in decreased delays for both UEs. It may be possible to implement such a cooperative CSI reporting technique in a manner that is transparent to the gNB and without any changes to the 3GPP Standard, at least according to some embodiments.

Figure 12:
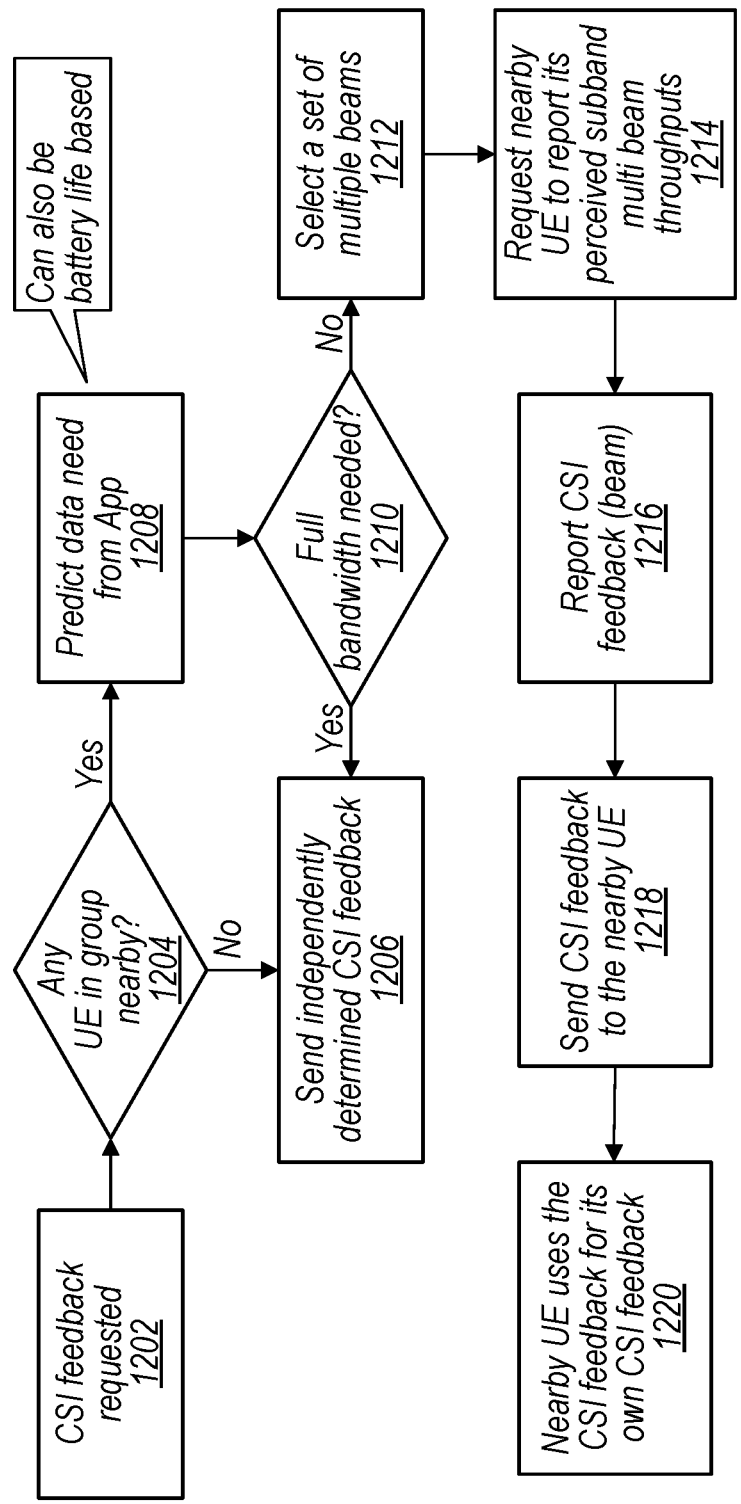
FIG. 12 is a flowchart diagram illustrating exemplary aspects of a technique for a UE to perform cooperative CSI reporting in a standard transparent manner for single user gNB operation, according to some embodiments.

FIG. 12 is a flowchart diagram illustrating exemplary aspects of a technique for a UE to perform cooperative CSI reporting in a standard transparent manner for single user gNB operation, according to some embodiments. As shown, in 1202, CSI feedback may be requested from the UE (e.g., in conjunction with periodic or aperiodic CSI reporting). In 1204, the UE may determine if there are any UEs nearby that could potentially perform cooperative CSI reporting with the UE, such as any UEs in a group of UEs configured for possible cooperative CSI reporting. If no such UEs are available, in 1206, the UE may independently determine its CSI feedback and perform the CSI feedback reporting. If any such UEs are available, in 1208, the UE may predict data communication needs, e.g., from any applications that are actively performing data communication. In 1210, the UE may determine if the full available bandwidth is needed for the data communication needs of the UE. If so, the method may proceed to step 1206 and the UE may independently determine its CSI feedback and perform the CSI feedback reporting. If not, the UE may determine to proceed with cooperative CSI reporting, and in 1212, the UE may select a set of multiple possible candidate beams.

Note that one or more other considerations, such as a UE battery reserve level and/or a power consumption mode (e.g., low power consumption mode or normal power consumption mode) of the UE could additionally or alternatively be used in steps 1208 and/or 1210 when determining whether to proceed with cooperative CSI reporting.

In 1214, the UE may request the UE(s) determined to be nearby and to be candidates for cooperative CSI reporting in step 1204 to report their perceived subband multi beam throughputs. Based on the CSI measurements of the UE and the information received from the nearby UE(s), in 1216, the UE may determine a beam to report as the best beam for the UE in its CSI feedback, and may perform CSI feedback reporting including providing an indication of that beam as the best beam for the UE. In 1218, the UE may indicate the CSI feedback reported by the UE to the nearby UE(s). In 1220, the nearby UE(s) may also report the same beam as reported by the UE in their CSI feedback reporting.

Such cooperative CSI reporting in SU operation may improve user experience by providing better overall QoS, for example as a result of potentially lower delays to perform data communication. It should also be noted, however, that as some or all of the cooperating UEs may be reporting a beam that would not be best for those UEs for maximizing potential throughput to those UEs, use of such a beam selection compromise among cooperating UEs may lead to lower overall network throughput in some instances.

In MU operation, for simultaneous scheduling in the same time frequency resource, in addition to having the same analog beam, it may also be required that UEs digital beams are separated/orthogonal. Accordingly, UEs in the same vicinity that determine to cooperatively perform CSI feedback reporting may determine to report a smaller rank than their maximum possible rank (e.g., if needed) and to report their digital precoding vectors such that their respective precoding matrices are separated/orthogonal. The MCS computation by each UE (e.g., in a 3GPP Standard transparent approach) may entail coordination by the UEs. In such a scenario, the UEs may not know if the gNB is going to co-schedule both of them together or with another UE. For MU operation it may be preferable that the reported precoding vector is close to the estimated singular vector of the UE, e.g., such that the UE may not have a high degree of liberty in modifying its precoding vectors. For example, if a UE deviates from its singular vector in order to report mutually orthogonal precoding vectors with a cooperating UE, the UE may need to compensate during MCS calculation.

Figure 13:
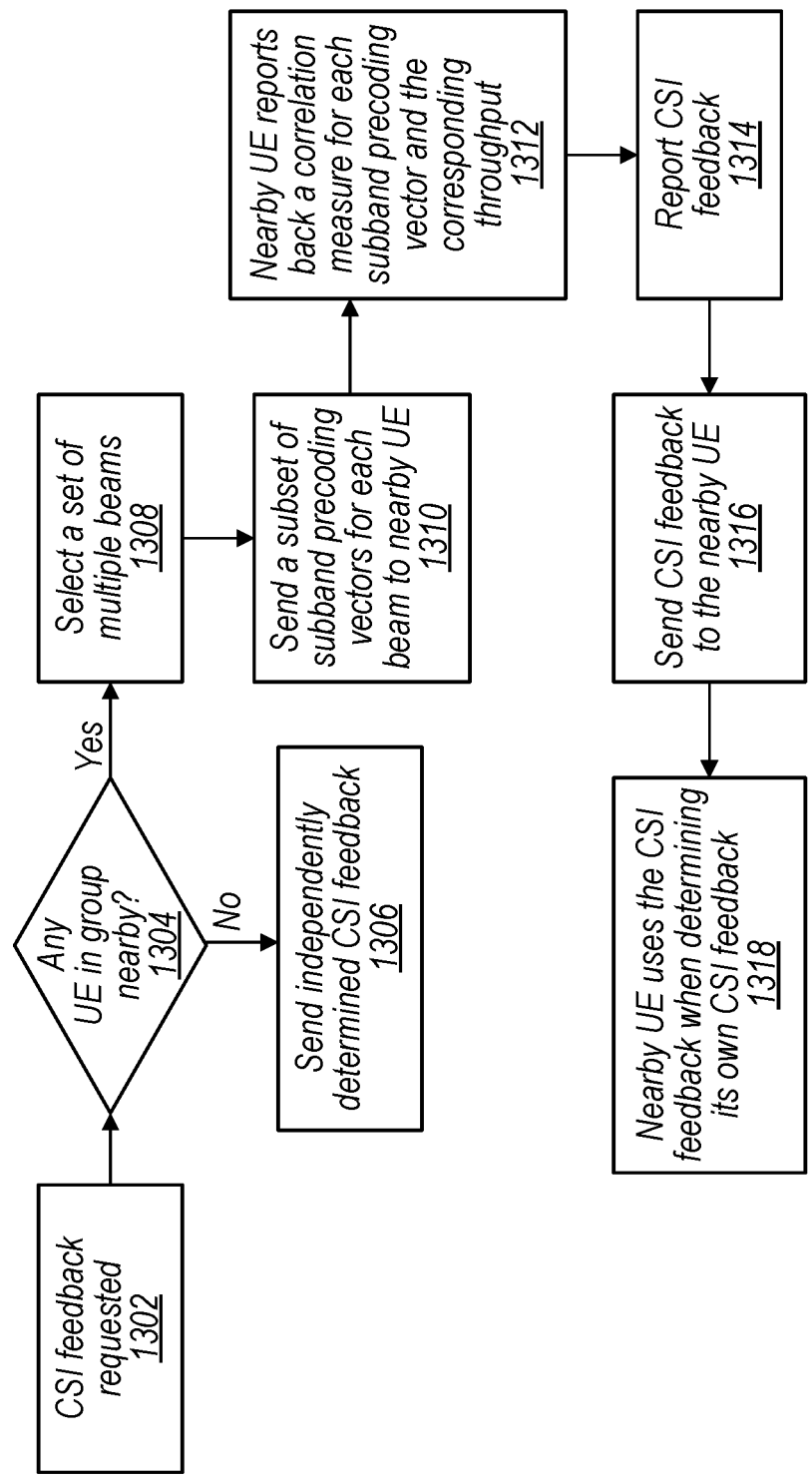
FIG. 13 is a flowchart diagram illustrating exemplary aspects of a technique for a UE to perform cooperative CSI reporting in a standard transparent manner for multi user gNB operation, according to some embodiments.

FIG. 13 is a flowchart diagram illustrating exemplary aspects of a technique for a UE to perform cooperative CSI reporting in a standard transparent manner for multi user gNB operation, according to some embodiments. As shown, in 1302, CSI feedback may be requested from the UE (e.g., in conjunction with periodic or aperiodic CSI reporting). In 1304, the UE may determine if there are any UEs nearby that could potentially perform cooperative CSI reporting with the UE, such as any UEs in a group of UEs configured for possible cooperative CSI reporting. If no such UEs are available, in 1306, the UE may independently determine its CSI feedback and perform the CSI feedback reporting. If any such UEs are available, and the UE determines to proceed with cooperative CSI reporting, in 1308, the UE may select a set of multiple possible candidate beams. In 1310, the UE may send a subset of sub-band precoding vectors for each beam of the selected set of beams to the nearby UE. In 1312, the UE may receive reporting from the nearby UE indicating a correlation measure for each of the subband precoding vectors and the corresponding throughput for the nearby UE for those precoding vectors. Based on its own CSI measurements and the information received from the nearby UE, in 1314, the UE may determine a beam and precoding vectors to report in its CSI feedback, and may perform CSI feedback reporting including providing an indication of that beam and those precoding vectors. In 1316, the UE may indicate the CSI feedback reported by the UE to the nearby UE. In 1318, the nearby UE(s) may report its own feedback, which may be selected based on its CSI measurements and the CSI feedback reported by the UE.

In MU operation (including in mmWave bands), it may be relatively uncommon for a gNB to find 2 UEs that can potentially share a time frequency resource. Cooperative CSI reporting techniques for MU operation may increase the chance of such opportunities occurring, which may in turn result in increased network throughput. However, in MU operation, sub-optimality in precoding vector reporting can result in worse performance in the case that a UE is co-scheduled with a different UE (e.g., that was not part of the cooperative CSI reporting). Thus, at least in some instances, there may be significant benefits if the network is able to prioritize co-scheduling UEs that are cooperating.

One way of achieving such prioritization may include providing support in the 3GPP standard for cooperative CSI reporting, and potentially for corresponding gNB scheduling behavior. For example, support may be provided to enable gNBs to know that a group of UEs are cooperating for their CSI feedback. In such a scenario, the UEs may be able to provide independent CSI feedback reporting in addition to cooperative CSI reporting (e.g., with members of the same family plan, or any other group of UEs configured for potential cooperative CSI reporting). The information exchange between the cooperating UEs could be performed through a cellular sidelink connection, in which case the gNB may also provide the UE ID (e.g., C-RNTI) of the other UE in the group with which the UE is coordinating its CSI feedback reporting. The UE may also inform the gNB of which UE(s) the UE is cooperating. While scheduling, the gNB may be able to indicate to the cooperating UE that it has been scheduled in the same time frequency resource with one or more UEs in the group with which the UE is coordinating its CSI feedback reporting. In some instances, it may further be possible that the coordinating and co-scheduled UEs could perform cooperative decoding. Thus, such techniques may potentially improve network throughput as well as user experience, at least in some embodiments.

Figure 14:
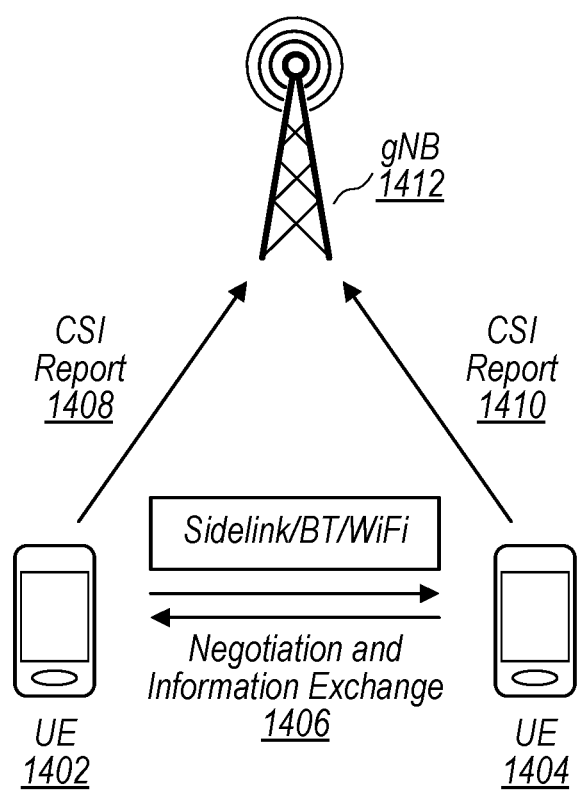
FIG. 14 illustrates exemplary negotiation and information exchange aspects of a possible scenario in which UEs are performing cooperative CSI reporting, according to some embodiments.

FIG. 14 illustrates exemplary negotiation and information exchange aspects of a possible scenario in which UEs are performing cooperative CSI reporting, according to some embodiments.

As shown, a UE 1402 and another UE 1404 may perform negotiation of whether to perform cooperative CSI reporting, and if they determine to proceed with cooperative CSI reporting, may exchange information to coordinate their CSI feedback reports (1406). Once this negotiation and information exchange 1406 is complete, the UE 1402 may provide its CSI report 1408 to the gNB 1412, and the UE 1404 may provide its CSI report 1410 to the gNB 1412.

In a single user gNB operation scenario, the information exchanged could include battery life information, application data requirements, a set of beams, and/or throughput for each beam. At least according to some embodiments, the UEs may determine to not perform information exchange (or to not perform any further information exchange) if one or both UEs have low battery or high application data requirements. Each CSI report may include indication of a commonly selected beam, as well as each UE's respective corresponding precoding matrices and MCS levels.

In a multi user gNB operation scenario, the information exchanged could include the same information as in SU operation (e.g., battery life information, application data requirements, a set of beams, and/or throughput for each beam), and also may include a set of precoding vectors for each beam, as well as coorelation between UEs precoding vectors for each beam. Each CSI report may include indication of a commonly selected beam, as well as each UE's respective precoding vectors (which may be selected based at least in part on the correlation, e.g., to minimize correlation between the precoding vectors of the cooperating UEs) and MCS levels.

In a scenario in which gNB support for cooperative CSI reporting is provided, the information exchanged may be unchanged from SU or MU operation scenarios, e.g., in accordance with the gNB operating mode. In the CSI requests from the gNB to each of the UEs, the C-RNTI of any UE(s) in a group of UEs configured for potential cooperative CSI reporting (e.g., UEs in the same family plan with a carrier that operates the gNB, as one possibility) with which the UE can potentially negotiate cooperative CSI reporting may be indicated, as well as any potential rank restriction of the negotiated CSI report. Each CSI report may be a multi-part CSI report, e.g., including a standard CSI report and a cooperative CSI report, and may also indicate the UE-ID (e.g., C-RNTI) of the UE(s) with which the UE is cooperating. Subsequently, when the gNB provides a scheduling grant, the C-RNTI of the cooperating UE with which the UE is co-scheduled may be indicated, e.g., if applicable.

In the following further exemplary embodiments are provided.

One set of embodiments may include an apparatus, comprising: a processor configured to cause a first wireless device to: establish a wireless link with a cellular base station; determine to coordinate channel state information reporting with a second wireless device; exchange information with the second wireless device via a sidelink wireless link; and provide channel state information for the first wireless device to the cellular base station, wherein the channel state information for the first wireless device is determined based at least in part on the information exchanged with the second wireless device via the sidelink wireless link.

According to some embodiments, the processor is further configured to cause the first wireless device to: select an analog beam to report in the channel state information for the first wireless device based at least in part on the information exchanged with the second wireless device via the sidelink wireless link.

According to some embodiments, the analog beam to report in the channel state information is selected to be a same analog beam as the second wireless device reports to the cellular base station in channel state information for the second wireless device.

According to some embodiments, the processor is further configured to cause the first wireless device to: select a set of precoding vectors to report in the channel state information for the first wireless device based at least in part on the information exchanged with the second wireless device via the sidelink wireless link.

According to some embodiments, the set of precoding vectors to report in the channel state information are selected to have low correlation values with a set of precoding vectors the second wireless device reports to the cellular base station in channel state information for the second wireless device.

According to some embodiments, the processor is further configured to cause the first wireless device to: determine application data needs for the first wireless device, wherein determining to coordinate channel state information reporting with the second wireless device is based at least in part on the application data needs for the first wireless device.

According to some embodiments, the processor is further configured to cause the first wireless device to: determine a battery reserve level for the first wireless device, wherein determining to coordinate channel state information reporting with the second wireless device is based at least in part on the battery reserve level for the first wireless device.

Another set of embodiments may include a first wireless device, comprising: an antenna; a radio operably coupled to the antenna; and a processor operably coupled to the radio; wherein the first wireless device is configured to: determine to coordinate channel state information reporting with a second wireless device; exchange information with the second wireless device via a sidelink wireless link; and provide channel state information for the first wireless device to the cellular base station, wherein the channel state information for the first wireless device is determined based at least in part on the information exchanged with the second wireless device via the sidelink wireless link.

According to some embodiments, one or more of an analog beam or one or more precoding vectors included in the channel state information for the first wireless device are determined based at least in part on the information exchanged with the second wireless device via the sidelink wireless link.

According to some embodiments, the first wireless device is configured to determine to coordinate channel state information reporting with the second wireless device based on one or more of: application data needs for one or more of the first wireless device or the second wireless device; a battery reserve level for one or more of the first wireless device or the second wireless device.

According to some embodiments, the first wireless device is further configured to: receive an indication from the cellular base station that the first wireless device can coordinate channel state information reporting with the second wireless device.

According to some embodiments, the first wireless device is further configured to: provide an indication to the cellular base station that the channel state information for the first wireless device is determined in coordination with the second wireless device.

According to some embodiments, the first wireless device is further configured to: provide second channel state information for the first wireless device to the cellular base station, wherein the second channel state information for the first wireless device is determined for the first wireless device independently from the second wireless device.

According to some embodiments, the first wireless device is further configured to: receive a scheduling indication from the cellular base station, wherein the scheduling indication includes information indicating that the second wireless device is co-scheduled with the first wireless device.

According to some embodiments, the sidelink wireless link includes one of: a cellular sidelink wireless link; a Wi-fi wireless link; or a Bluetooth wireless link.

Yet another set of embodiments may include a cellular base station, comprising: an antenna; a radio operably coupled to the antenna; and a processor operably coupled to the radio; wherein the cellular base station is configured to: establish a wireless link with a first wireless device; receive first channel state information from the first wireless device, wherein the first channel state information includes channel state information for the first wireless device that is generated in coordination with a second wireless device, wherein the first channel state information includes information identifying the second wireless device.

According to some embodiments, the first channel state information further includes channel state information for the first wireless device that is generated without coordination with the second wireless device.

According to some embodiments, the cellular base station is further configured to: provide an channel state information request to the first wireless device, wherein the channel state information request includes information identifying the second wireless device.

According to some embodiments, the channel state information request includes a rank restriction for coordinated channel state information reporting.

According to some embodiments, the cellular base station is further configured to: schedule a communication with the first wireless device during a first transmission time interval, wherein a communication with the second wireless device is also scheduled during the first transmission time interval; and provide a scheduling indication for the communication with the first wireless device during the first transmission time interval to the first wireless device, wherein the scheduling indication includes information indicating that the second wireless device is also scheduled during the first transmission time interval.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:
1. An apparatus, comprising:
a processor configured to cause a first wireless device to:
establish a wireless link with a cellular base station;
determine application data needs for the first wireless device;
determine to coordinate channel state information reporting with a second wireless device, wherein determining to coordinate channel state information reporting with the second wireless device is based at least in part on the application data needs for the first wireless device;
exchange information with the second wireless device via a sidelink wireless link; and
provide channel state information for the first wireless device to the cellular base station, wherein the channel state information for the first wireless device is determined based at least in part on the information exchanged with the second wireless device via the sidelink wireless link.

2. The apparatus of claim 1, wherein the processor is further configured to cause the first wireless device to:
select an analog beam to report in the channel state information for the first wireless device based at least in part on the information exchanged with the second wireless device via the sidelink wireless link.

3. The apparatus of claim 2,
wherein the analog beam to report in the channel state information is selected to be a same analog beam as the second wireless device reports to the cellular base station in channel state information for the second wireless device.

4. The apparatus of claim 1, wherein the processor is further configured to cause the first wireless device to:
select a set of precoding vectors to report in the channel state information for the first wireless device based at least in part on the information exchanged with the second wireless device via the sidelink wireless link.

5. The apparatus of claim 4,
wherein the set of precoding vectors to report in the channel state information are selected to have low correlation values with a set of precoding vectors the second wireless device reports to the cellular base station in channel state information for the second wireless device.

6. The apparatus of claim 1, wherein the processor is further configured to cause the first wireless device to:
determine a battery reserve level for the first wireless device,
wherein determining to coordinate channel state information reporting with the second wireless device is based at least in part on the battery reserve level for the first wireless device.

7. A first wireless device, comprising:
an antenna;
a radio operably coupled to the antenna; and
a processor operably coupled to the radio;
wherein the first wireless device is configured to:
determine to coordinate channel state information reporting with a second wireless device;
exchange information with the second wireless device via a sidelink wireless link; and
provide channel state information for the first wireless device to a cellular base station, wherein the channel state information for the first wireless device is determined based at least in part on the information exchanged with the second wireless device via the sidelink wireless link, wherein one or more of an analog beam or one or more precoding vectors included in the channel state information for the first wireless device are determined based at least in part on the information exchanged with the second wireless device via the sidelink wireless link.

8. The first wireless device of claim 7,
wherein the first wireless device is configured to determine to coordinate channel state information reporting with the second wireless device based on one or more of:
application data needs for one or more of the first wireless device or the second wireless device; or
a battery reserve level for one or more of the first wireless device or the second wireless device.

9. The first wireless device of claim 7, wherein the first wireless device is further configured to:
receive an indication from the cellular base station that the first wireless device can coordinate channel state information reporting with the second wireless device.

10. The first wireless device of claim 7, wherein the first wireless device is further configured to:
provide an indication to the cellular base station that the channel state information for the first wireless device is determined in coordination with the second wireless device.

11. The first wireless device of claim 7, wherein the first wireless device is further configured to:
provide second channel state information for the first wireless device to the cellular base station, wherein the second channel state information for the first wireless device is determined for the first wireless device independently from the second wireless device.

12. The first wireless device of claim 7, wherein the first wireless device is further configured to:
receive a scheduling indication from the cellular base station, wherein the scheduling indication includes information indicating that the second wireless device is co-scheduled with the first wireless device.

13. The first wireless device of claim 7, wherein the sidelink wireless link includes one of:
a cellular sidelink wireless link;
a Wi-fi wireless link; or
a Bluetooth wireless link.

14. A cellular base station, comprising:
an antenna;
a radio operably coupled to the antenna; and
a processor operably coupled to the radio;
wherein the cellular base station is configured to:
establish a wireless link with a first wireless device;
receive first channel state information from the first wireless device, wherein the first channel state information includes channel state information for the first wireless device that is generated in coordination with a second wireless device, wherein the first channel state information includes information identifying the second wireless device;
schedule a communication with the first wireless device during a first transmission time interval, wherein a communication with the second wireless device is also scheduled during the first transmission time interval; and
provide a scheduling indication for the communication with the first wireless device during the first transmission time interval to the first wireless device, wherein the scheduling indication includes information indicating that the second wireless device is also scheduled during the first transmission time interval.

15. The cellular base station of claim 14,
wherein the first channel state information further includes channel state information for the first wireless device that is generated without coordination with the second wireless device.

16. The cellular base station of claim 14, wherein the cellular base station is further configured to:
provide an channel state information request to the first wireless device, wherein the channel state information request includes information identifying the second wireless device.

17. The cellular base station of claim 16,
wherein the channel state information request includes a rank restriction for coordinated channel state information reporting.

* * * * *